United States Patent
Chess et al.

(10) Patent No.: US 8,434,077 B2
(45) Date of Patent: Apr. 30, 2013

(54) UPGRADING VIRTUAL RESOURCES

(75) Inventors: David Michael Chess, Mohegan Lake, NY (US); Daniel Manuel Dias, Mohegan Lake, NY (US); James Edwin Hanson, Yorktown Heights, NY (US); Giovanni Pacifici, New York, NY (US); Hidayatullah Habeebullah Shaikh, Mohegan Lake, NY (US); Steve Richard White, New York, NY (US); Jian Yin, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 1159 days.

(21) Appl. No.: 11/874,494

(22) Filed: Oct. 18, 2007

(65) Prior Publication Data

US 2009/0106748 A1  Apr. 23, 2009

(51) Int. Cl.
*G06F 9/44* (2006.01)

(52) U.S. Cl.
USPC ............ 717/168; 717/169; 717/174; 717/175

(58) Field of Classification Search .......... 717/168–178; 718/1, 106
See application file for complete search history.

(56) References Cited

U.S. PATENT DOCUMENTS

| | | | |
|---|---|---|---|
| 5,519,866 A * | 5/1996 | Lawrence et al. | 717/162 |
| 6,735,766 B1 | 5/2004 | Chamberlain et al. | |
| 6,950,847 B2 | 9/2005 | Harrisville-Wolff et al. | |
| 7,013,461 B2 | 3/2006 | Hellerstein et al. | |
| 7,024,450 B1 | 4/2006 | Deo et al. | |
| 7,185,332 B1 * | 2/2007 | Waldin et al. | 717/170 |
| 7,210,143 B2 * | 4/2007 | Or et al. | 717/174 |
| 7,337,184 B1 * | 2/2008 | Or et al. | 1/1 |
| 7,765,538 B2 * | 7/2010 | Zweifel et al. | 717/168 |
| 2004/0237081 A1 | 11/2004 | Homiller | |
| 2005/0132382 A1 | 6/2005 | McGuire et al. | |
| 2005/0240795 A1 | 10/2005 | Paller et al. | |
| 2005/0257206 A1 * | 11/2005 | Semerdzhiev | 717/168 |
| 2006/0026590 A1 | 2/2006 | Berenberg et al. | |
| 2006/0031823 A1 | 2/2006 | Vasilevskiy et al. | |
| 2006/0080656 A1 | 4/2006 | Cain et al. | |
| 2006/0150188 A1 | 7/2006 | Roman et al. | |
| 2007/0033201 A1 * | 2/2007 | Stienhans | 707/100 |
| 2007/0106978 A1 * | 5/2007 | Felts | 717/124 |
| 2011/0137953 A1 * | 6/2011 | Bobick et al. | 707/799 |

OTHER PUBLICATIONS

Doval et al, "Automatic Clustering of Software Systems Using a Genetic Algorithm", Proceedings of the Ninth International Workshop Software Technology and Engineering Practice, Aug. 1999, pp. 73-81.

Yacoub et al, "A Scenario-Based Reliability Analysis Approach for Component-Based Software", IEEE Transactions on Reliability, vol. 53, No. 4, Dec. 2004, pp. 465-480.

\* cited by examiner

*Primary Examiner* — Lewis A Bullock, Jr.
*Assistant Examiner* — Tina Huynh
(74) *Attorney, Agent, or Firm* — Yee & Associates, P.C.; Louis J. Percello (57) ABSTRACT

Upgrading a multi-tiered application is provided. In response to receiving a request to upgrade a multi-tiered application, wherein components of the multi-tiered application are deployed across a plurality of virtual machines, an appropriate integrated patch is selected for the upgrade. The selected integrated patch includes an integrated set of patches for the components of the multi-tiered application, state update data, and order constraints. The components of the multi-tiered application specified in the selected integrated patch are upgraded by using the integrated set of patches and order constraints. In addition, the state of the components of the multi-tiered application are updated by using the state update data. Then, the updated state of the multi-tiered application is saved to storage.

20 Claims, 4 Drawing Sheets

UPGRADING VIRTUAL RESOURCES

BACKGROUND OF THE INVENTION

1. Field of the Invention

The present invention relates generally to an improved data processing system. More specifically, the present invention is directed to a computer implemented method, system, and computer usable program code for upgrading a multi-tiered application distributed onto a set of virtual machines.

2. Description of the Related Art

Many modern software services provide complex functionality and have a variety of quality of service (QOS) requirements, such as latency bound and sustainable throughput. Such software services are usually implemented with a set of software pieces from many layers that interact with each other. Each piece of the software is called a software component.

A clustered software service, such as a Java 2 Enterprise Edition (J2EE®), may, for example, use Linux® as the operating system, java virtual machine (JVM®) on the next immediate layer above the operating system, WebSphere® proxies as content-aware routers, WebSphere® application servers as backend servers, WebSphere® deployment manager as a centralized administration point, Database 2 (DB2®) as a persistent data store, MQ Series® as an electronic messaging server, WebSphere® portal server as a Web portal server, WebSphere® process server as a process server, and other high level development environments. Moreover, this clustered software service may be deployed over a set of virtual machines within the cluster for scalability.

The configuration of a software service rarely remains unchanged throughout the lifetime of a service. A software service may frequently be upgraded for several reasons. For example, a software service may be upgraded because: 1) a software component requires a security patch to prevent security breaches; 2) a software component requires an upgrade to a newer version to provide additional features and/or increased performance; and 3) the software service needs to increase its scalability by adding or changing hardware and/or software components in the service in order to serve more users.

Upgrading a software service is a complex and error-prone task. The task of upgrading is error-prone because complex interactions and dependencies often exist among the software and hardware components in the software service. For example, changing only one part of a software service configuration, without fixing an existing dependency, may easily break the whole service.

Typically, current software service upgrades are performed manually. In other words, a system administrator figures out all the software and hardware component dependencies and then devises a plan to implement the upgrade. This manual process not only requires considerable expertise (i.e., knowledge of all the software components involved in the upgrade and an ability to foresee all the dependent changes) by the system administrator, it also requires a considerable amount of time because the software components need to be upgraded one by one, which results in considerable system downtime in some situations.

Therefore, it would be beneficial to have an improved computer implemented method, system, and computer usable program code for upgrading components of a software service application that are distributed across a set of virtual machines in a data processing system.

SUMMARY OF THE INVENTION

Illustrative embodiments provide a computer implemented method, system, and computer usable program code for upgrading a multi-tiered application. In response to receiving a request to upgrade a multi-tiered application, wherein components of the multi-tiered application are deployed across a plurality of virtual machines, an appropriate integrated patch is selected for the upgrade. The selected integrated patch includes an integrated set of patches for the components of the multi-tiered application, state update data, and order constraints. The components of the multi-tiered application specified in the selected integrated patch are upgraded by using the integrated set of patches and order constraints. In addition, the state of the components of the multi-tiered application are updated by using the state update data. Then, the updated state of the multi-tiered application is saved to storage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
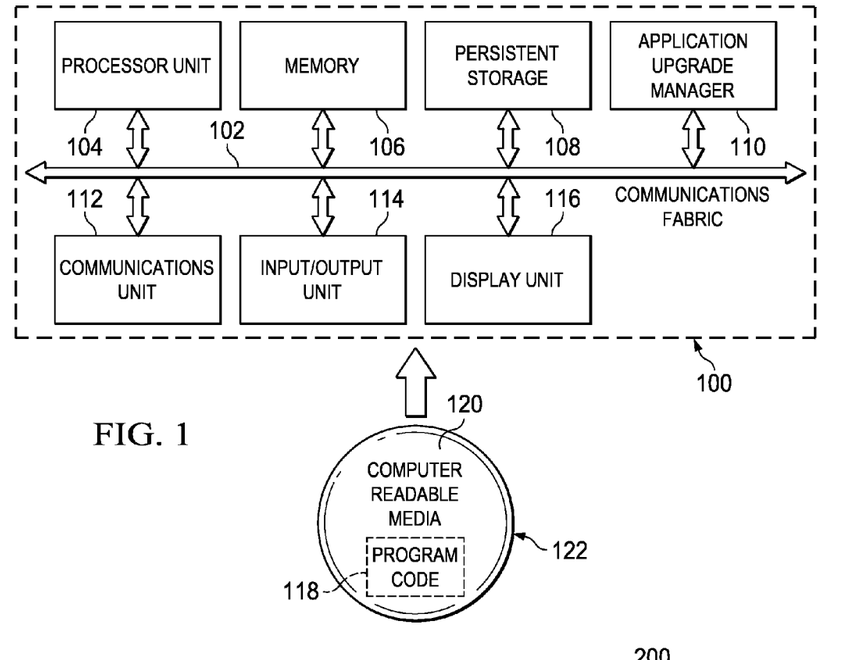
FIG. 1 is a diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. In this illustrative example, data processing system 100 includes communications fabric 102, which provides communications between processor unit 104, memory 106, persistent storage 108, application upgrade manager 110, communications unit 112, input/output (I/O) unit 114, and display unit 116.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip.

As another illustrative example, processor unit 104 may be a symmetric multi-processor system containing multiple processors of the same type.

Memory 106, in these examples, may be, for example, a random access memory (RAM). Persistent storage 108 may take various forms depending on the particular implementation. For example, persistent storage 108 may contain one or more components or devices, such as a hard drive, a flash memory, a rewritable optical disk, a rewritable magnetic tape, or some combination of the above. The media used by persistent storage 108 also may be removable. For example, a removable hard drive may be used for persistent storage 108.

Application upgrade manager 110 is a component that manages software application upgrades. In particular, application upgrade manager 110 manages upgrade operations for software components of a multi-tiered application that is distributed across a set of virtual machines within data processing system 100. It should be noted that application upgrade manager 110 may be implemented entirely as software, entirely as hardware, or as a combination of both software and hardware. Further, a user, such as a system administrator, may enable and disable application upgrade manager 110 independently of other data processing system 100 features and components.

Communications unit 112, in these examples, provides for communications with other data processing systems or devices. In these examples, communications unit 112 is a network interface card. Communications unit 112 may provide communications through the use of either or both physical and wireless communications links.

Input/output unit 114 allows for input and output of data with other devices that may be connected to data processing system 100. For example, input/output unit 114 may provide a connection for user input through a keyboard and mouse. Further, input/output unit 114 may send output to a printer. Display unit 116 provides a mechanism to display information to the user.

Instructions for an operating system and applications or programs are located on persistent storage 108. These instructions may be loaded into memory 106 for execution by processor unit 104. The processes of different illustrative embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different illustrative embodiments may be embodied on different physical or tangible computer readable media, such as memory 106 or persistent storage 108.

Program code 118 is located in a functional form on computer readable media 120 and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive or a flash memory that is connected to data processing system 100. The tangible form of computer readable media 120 is also referred to as computer recordable storage media.

Alternatively, program code 118 may be transferred to data processing system 100 from computer readable media 120 through a communications link to communications unit 112 and/or through a connection to input/output unit 114. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache, such as found in an interface and memory controller hub, which may be present in communications fabric 102.

Illustrative embodiments provide a computer implemented method, system, and computer usable program code for upgrading a multi-tiered application. In response to receiving a request to upgrade a multi-tiered application, an application upgrade manager selects an appropriate integrated patch for the upgrade. Software components of the multi-tiered application may be deployed in one virtual machine or across a plurality of virtual machines. The plurality of virtual machines may be hosted by one data processing system or by a plurality of data processing systems.

The selected integrated patch may include an integrated set of patches for the software components of the multi-tiered application, state update data, and order constraints. The integrated set of patches includes a plurality of patches needed to upgrade the components of the multi-tiered application to meet certain security and/or feature requirements. The application upgrade manager upgrades the software components of the multi-tiered application that are specified in the selected integrated patch by using the integrated set of patches and order constraints. In addition, the application upgrade manager updates the state of the upgraded software components by using the state update data. Then, the application upgrade manager saves the updated state of the multi-tiered application to a persistent storage unit.

Further, the application upgrade manager determines patch dependencies among the software components of the multi-tiered application by using a dependency graph. The dependency graph represents direct interdependencies among the software components. Each node in the dependency graph represents a patch for a software component and each arrow represents a dependency among different patches. The application upgrade manager may recursively traverse the dependency graph to determine a set of software components that one or more of the software components depend upon.

Furthermore, a software component may be shared by two or more multi-tiered applications. As a result, a patch for that shared software component may be included in a plurality of dependency graphs. Thus, the application upgrade manager may recursively traverse the plurality of dependency graphs searching for a set of software components, which one or more of the software components depend upon.

Moreover, the application upgrade manager constructs an integrated patch based on the determined patch dependencies and other information. Patch dependency data and the other information may be extracted by a manual process, an automatic process, or a semi-automatic process. The other information may be extracted by analyzing configuration data associated with deployment of software components, analyzing configuration data that is generated during deployment of the software components, or analyzing code of the software components. After constructing the integrated patch, the application upgrade manager stores the integrated patch in the persistent storage unit.

Thus, illustrative embodiments provide an integrated solution for software service upgrade based on virtual machine image manipulation by reducing software service upgrades to simple patch operations for current virtual machine images. Illustrative embodiments view all software deployed in each node as a virtual machine image instead of a collection of software components. Illustrative embodiments package all the required upgrade changes as a single integrated set of patches to the virtual machine image.

Applying the integrated set of patches at once, instead of upgrading each software components one by one, decreases the amount of time required to perform the software service upgrade process. As a result, potential system downtime associated with software service upgrade is decreased. Moreover, illustrative embodiments relieve the system administrator of the requirement of knowing and understanding all the complex interactions and dependencies among the software components. Consequently, the system administrator is able to avoid potential mistakes associated with not knowing, or misunderstanding, all of the complex interactions and dependencies among the software components.

Figure 2:
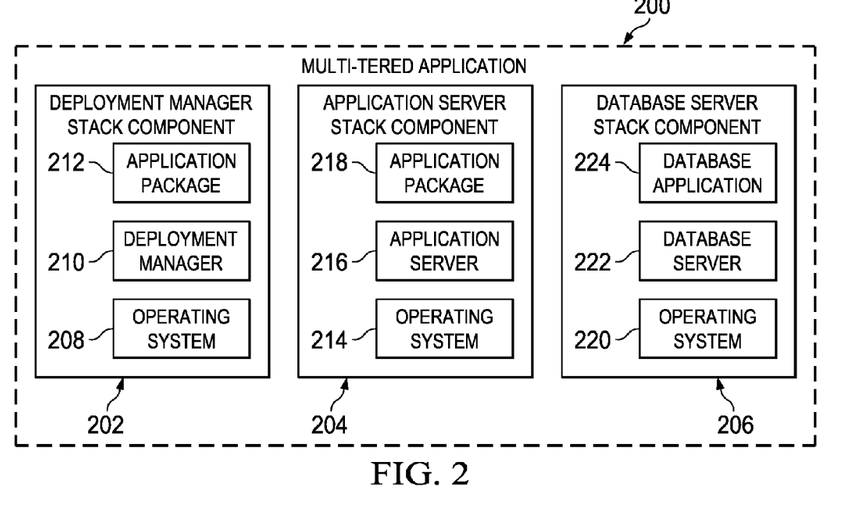
FIG. 2 is an exemplary illustration of a multi-tiered application in accordance with an illustrative embodiment.

With reference now to FIG. 2, an exemplary illustration of a multi-tiered application is depicted in accordance with an illustrative embodiment. Multi-tiered application 200 provides a software service and may represent any type of multi-tiered application, such as, for example, a J2EE® enterprise application. A multi-tiered application divides functionality into separate tiers (i.e., logical groupings of functionality).

Although tiers of a multi-tiered application may reside on the same computer, typically tiers of Web-based application reside on separate computers. Consequently, multi-tiered application 200 may be implemented in a single data processing system, such as data processing system 100 in FIG. 1, or in a plurality of data processing systems, which are connected together via a network. The network may, for example, be a local area network (LAN), a wide area network (WAN), or the Internet.

In this illustrative example, multi-tiered application 200 includes three top-level components. However, it should be noted that multi-tiered application 200 may include more or fewer tiers depending upon implementation. The three top-level components are deployment manager stack component 202, application server stack component 204, and database server stack component 206. However, it should be noted that these three top-level components may be any type of software component capable of functioning in multi-tiered application 200.

In addition, each of these top-level components include several other software components. For example, deployment manager stack component 202 includes operating system component 208, deployment manager component 210, and application package component 212. Operating system component 208 may, for example, be a Linux® operating system; deployment manager component 210 may, for example, be a WebSphere® deployment manager; and application package component 212 may, for example, be a J2EE® application package as an enterprise archive (EAR).

Application server stack component 204 includes operating system component 214, application server component 216, and application package component 218. Operating system component 214 may also be a Linux® operating system. Application server component 216 may, for example, be a WebSphere® application server. Application package component 218 may also be a J2EE® application package as an enterprise archive (EAR).

Database server stack component 206 includes operating system component 220, database server component 222, and database application component 124. Operating system component 220 may also be a Linux® operating system. Database server component 222 may, for example, be a DB2® server. Database application component 224 may, for example, be a DB2® application.

It should be noted that a software stack component, such as deployment manager stack component 202, application server stack component 204, and database server stack component 206, may be shared by a plurality of applications. For example, database server stack component 206 may be shared by a market analysis application and a market trend prediction application, which both use the same data. In addition, it should be noted that all these software stack components may be hosted in one physical or virtual machine.

Alternatively, all these software stack components may be distributed for scalability. For example, deployment manager stack component 202 may be hosted in virtual machine A, application server stack component 204 may be hosted in virtual machine B, and database server stack component 206 may be hosted in virtual machine C. Moreover, virtual machines A, B, and C may be further hosted by physical machine 1, 2, and 3, respectively.

Traditionally, a software service is upgraded by manually upgrading each software component separately. This manual upgrade process is not only time consuming, and thus expensive in the term of labor cost, but this manual upgrade process is also error-prone because complex dependencies may exist among the patches for the software components. Blindly patching one software component, without considering its dependencies, may break the whole software service.

For example, one version of a patch for application server component 216 may require a certain version of a Linux® operating system kernel. Thus, applying the patch for application server component 216, without patching operating system component 214 at the same time, may break the whole software service. Moreover, identifying a set of patches to meet certain security or performance requirements may be challenging as well, because many dependencies among software components may exist. However, illustrative embodiments provide a simplified method for upgrading the software service by creating and applying an integrated set of patches for the whole software service instead of just one software component.

Figure 3:
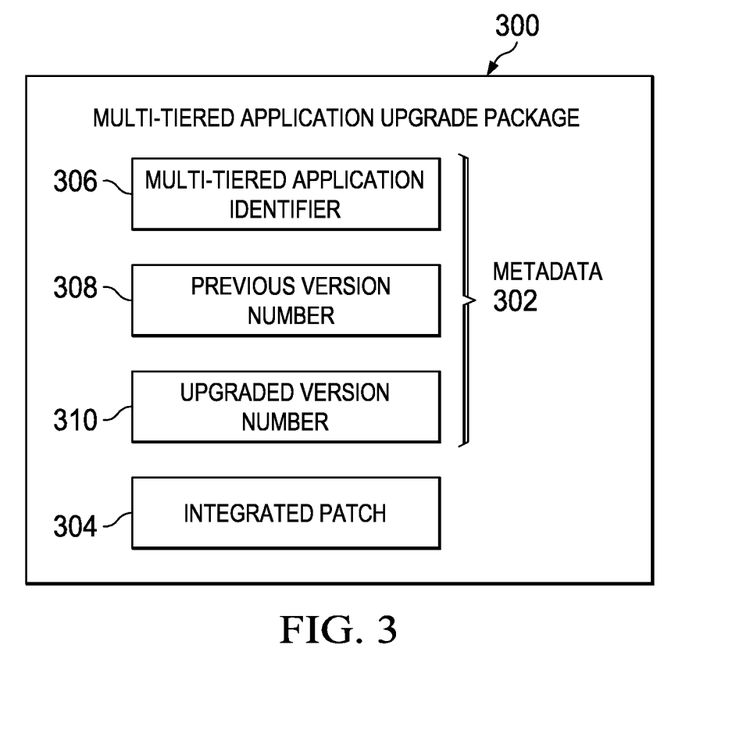
FIG. 3 is an exemplary illustration of a multi-tiered application upgrade package in accordance with an illustrative embodiment.

With reference now to FIG. 3, an exemplary illustration of a multi-tiered application upgrade package is depicted in accordance with an illustrative embodiment. Multi-tiered application upgrade package 300 is a package of data needed to upgrade a multi-tiered application, such as multi-tiered application 200 in FIG. 2 that provides a software service. Multi-tiered application upgrade package 300 includes metadata 302 and integrated patch 304.

Metadata 302 is information regarding the multi-tiered application that is to be upgraded. In other words, metadata 302 describes where and how an application upgrade manager, such as application upgrade manager 110 in FIG. 1, may apply multi-tiered application upgrade package 300. Metadata 302 includes multi-tiered application identifier 306, previous version number 308, and upgraded version number 310.

Multi-tiered application identifier 306 specifically identifies the multi-tiered application that is to be upgraded. Previous version number 308 specifically identifies which version of the multi-tiered application is to be upgraded during the upgrade process. In other words, previous version number 308 is the version number of the multi-tiered application that integrated patch 304 may be applied to during the upgrade. Upgraded version number 310 specifically identifies the version number of the multi-tiered application after applying integrated patch 304. Integrated patch 304 includes all the data necessary to upgrade components of the multi-tiered application. If the application upgrade manager determines that multi-tiered application identifier 306 and previous version number 308 are the correct identifier and version for upgrading the multi-tiered application, then the application upgrade manager applies integrated patch 304 to the multi-tiered application to bring the multi-tiered application to upgraded version number 310.

Figure 4:
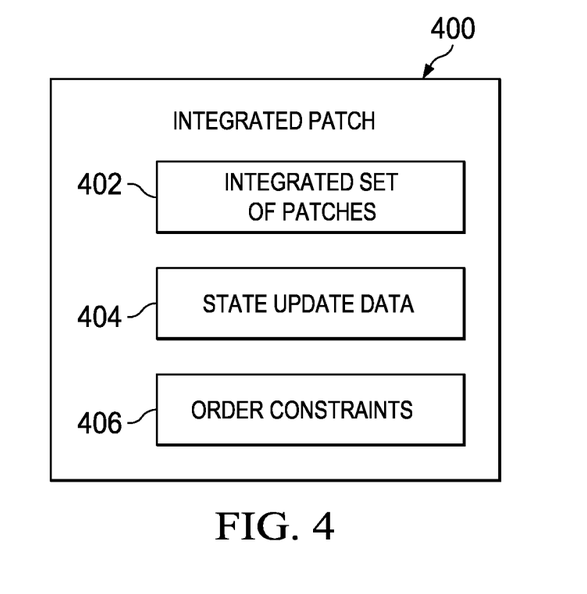
FIG. 4 is an exemplary illustration of an integrated patch in accordance with an illustrative embodiment.

With reference now to FIG. 4, an exemplary illustration of an integrated patch is depicted in accordance with an illustrative embodiment. Integrated patch 400 may, for example, be integrated patch 304 in FIG. 3. Integrated patch 400 includes integrated set of patches 402, state update data 404, and order constraints 406.

Integrated set of patches 402 is a set of one or more patches needed to upgrade software components of a multi-tiered application, such as multi-tiered application 200 in FIG. 2. In addition, integrated set of patches 402 includes the scripts and/or procedures required to apply integrated set of patches 402 to the multi-tiered application. State update data 404 includes a set of scripts, programs, workflows, automations, and/or procedures for updating the state of each software component to be compatible with the new version of the software component, such as upgraded version number 310 in FIG. 3, after the application upgrade manager completes the upgrade process.

Order constraints 406 are restrictions on the order of software component upgrade based on dependencies among the different software components of the multi-tiered application. In other words, order constraints 406 are the order constraints for applying one or more of the steps in the upgrade process. The steps may, for example, include applying individual patches and updating the state for individual software components. However, it should be noted that order constraints 406 may apply to more steps as need by processes of illustrative embodiments.

In addition, it should be noted that integrated patch 400 may comprise a hierarchical structure because the software service may also comprise a hierarchical structure. In other word, integrated patch 400 may comprise a plurality of integrated patches, just as a software component may comprise a plurality of software components, such as, for example, deployment manager stack component 202 is composed of operating system component 208, deployment manager component 210, and application package component 212.

One step in constructing integrated patch 400 is to identify the set of necessary patches that meet certain security and/or performance requirements for the multi-tiered application. This identifying step may be performed manually or automatically. One possible method for automatic patch identification may be performed on a data storage structure that labels each patch with a set of attributes describing which requirement the patch fulfills and other properties. Then, a user or the application upgrade manager may perform a query, which is similar to a database query, on the set of labeled patches in storage to retrieve the set of required patches that meet the specified requirements and/or have or do not have certain properties. Another step in constructing integrated patch 400 is to use the dependencies among the set of integrated patches to construct a coordinated patch process.

Figure 5:
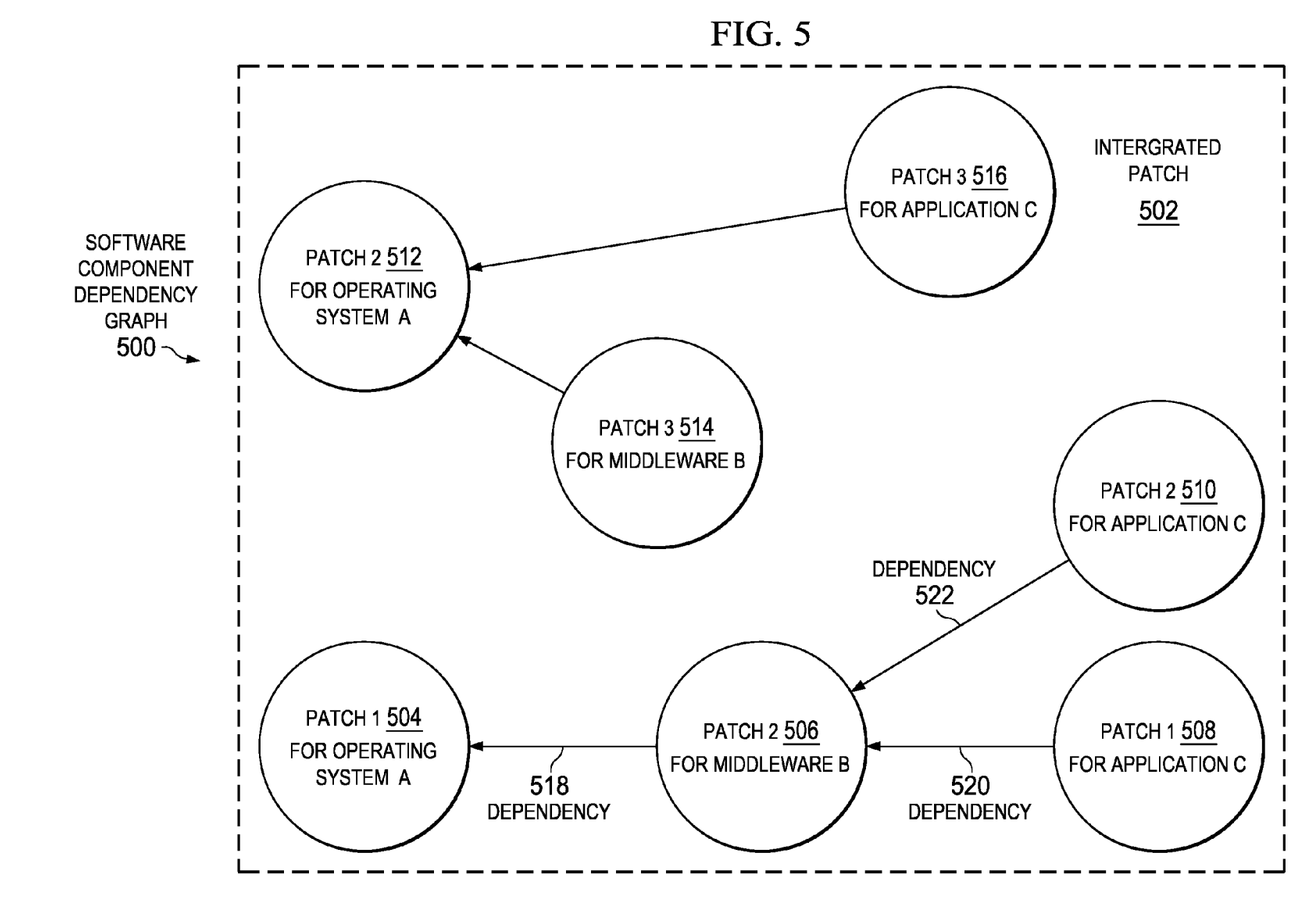
FIG. 5 is an exemplary illustration of a software component dependency graph in accordance with an illustrative embodiment.

With reference now to FIG. 5, an exemplary illustration of a software component dependency graph is depicted in accordance with an illustrative embodiment. Software component dependency graph 500 is a diagram that illustrates dependencies among software components in a multi-tiered application, such as multi-tiered application 200 in FIG. 2. In particular, software component dependency graph 500 shows the dependencies associated with integrated patch 502.

Integrated patch 502 includes a plurality of patches, such as patch 1 504, patch 2 506, patch 1 508, patch 2 510, patch 2 512, patch 3 514, and patch 3 516, for software components of the multi-tiered application. For example, patch 1 504 is a patch for operating system A, such as operating system 208 in FIG. 2; patch 2 506 is a patch for middleware B, such as operating system 214 in FIG. 2; patch 1 508 is a patch for application C, such as operating system 220 in FIG. 2; and patch 2 510 also is a patch for application C. In addition, patch 2 512 is a patch for operating system A; patch 3 514 is a patch for middleware B; and patch 3 516 is a patch for application C.

In addition to showing the plurality of patches in integrated patch 502, software component dependency graph 500 also shows the dependencies among the software components. For example, the nodes of software component dependency graph 500 represent patches for the different software components. The arrows represent dependencies among the integrated set of patches.

Two kinds of dependency may exist. One kind of dependency is direct dependency. Direct dependency is where after a first patch is applied to a software component, a second patch is required to be applied because of the first patch. To process this first kind of dependency, simply traversing software component dependency graph 500 by following the direction of arrows is sufficient. For example, software component dependency graph includes dependency 518, dependency 520, and dependency 522. Dependency 518 means that patch 1 504 for operating system A is applied before patch 2 506 for middleware B; dependency 520 means that patch 2 506 for middleware B is applied before patch 1 508 for application C; and dependency 522 means that patch 1 508 for application C is applied before patch 2 510 for application C. Further, patch 1 504 for operating system A and its dependencies 518, 522, and 524 are applied before patch 2 512 for operating system A. Furthermore, patch 2 512 for operating system A is applied before patch 3 514 for middleware B and patch 3 516 for application C. In this illustrative example, no dependency exists between patch 3 514 for middleware B and patch 3 516 for application C. As a result, patch 3 514 for middleware B and patch 3 516 for application C may, for example, be applied at the same time or without order constraint.

Another kind of dependency is order dependency. To process this second type of dependency, a procedure, such as, for example, topological sorting may be used. It should be noted that direct dependency is illustrated in FIG. 5. However, those of ordinary skill in the art may easily generalize this process to order dependency.

Illustrative embodiments provide a method for not only applying upgrades to software components deployed in one machine, but also applying upgrades to software components deployed in several physical machines, or several virtual machines, or several virtual machines that are hosted by several physical machines. The software component dependencies may be generated by static content, such as, for example, the code for each software component or the configuration generated at run time during service deployment, configuration, and continuous configuration changes during the lifetime of the software service.

Illustrative embodiments also provide methods for extracting dependency and other information that is necessary for constructing the integrated patch, such as integrated patch 400 in FIG. 4. This information may be extracted manually, automatically, or semi-automatically. The configuration data, the application logs, and the application code may all be used to extract the metadata, such as metadata 302 in FIG. 3. Statically, compiler analysis, dynamic analysis, rule-based system, and data mining may all be used to extract this metadata.

In some cases, the analysis tools used to extract the metadata do not need to be 100% precise. For example, a semi-automatic procedure includes interaction with users. This semi-automatic procedure may include three steps: 1) the analysis tool proposes some possible metadata, such as a dependency; 2) a user verifies the metadata for correctness; and 3) then the metadata is incorporated into the integrated patch.

Verification of the metadata by a user eliminates the requirement for the analysis tools to be correct all the time. Thus, the analysis tools are not limited to scenarios where the analysis tools always need to be 100% correct. As a result, the analysis tools may point out to users some metadata that the users may normally ignore in a fully manual process.

It should be noted that the procedure specified in an integrated patch may not be a fixed sequence of actions. In other words, the procedure may be very flexible. For example, the constraint for each step of the procedure may be a partial ordering. In addition, the integrated patch does not need to specify that a particular patch must be included in the upgrade process. As a result, the application upgrade manager may select among the set of patches only those patches that meet certain requirements.

The order constraints, such as order constraints 406 in FIG. 4, may specify how the application upgrade manager may select patches. Given the set of order constraints, run time optimization is possible by selecting a particular sequence of actions to optimize certain object functions, such as minimizing the time needed for upgrade, minimizing service interrupt time, or a combination of the two. Alternatively, a weighted function of minimizing the time needed for upgrade and minimizing service interrupt time may be used. It should be noted that existing optimization algorithms may be utilized.

Figure 6:
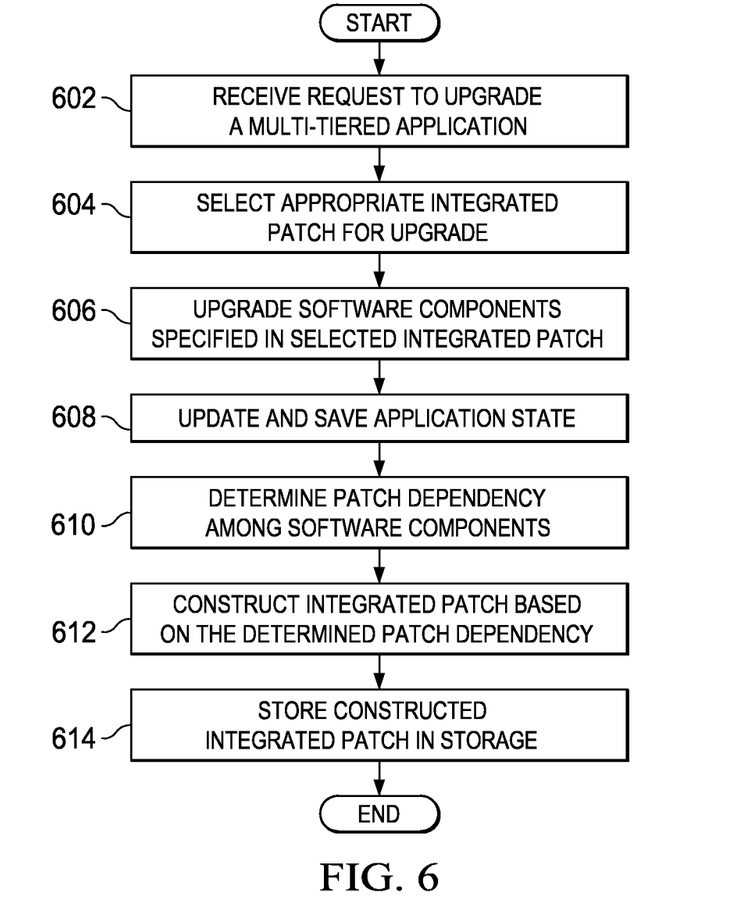
FIG. 6 is a flowchart illustrating an exemplary process for upgrading software components of a multi-tiered application distributed onto a set of virtual machines in accordance with an illustrative embodiment.

With reference now to FIG. 6, a flowchart illustrating an exemplary process for upgrading software components of a multi-tiered application distributed onto a set of virtual machines is shown in accordance with an illustrative embodiment. The process shown in FIG. 6 may be implemented in an application upgrade manager, such as, for example, application upgrade manager 110 in FIG. 1.

The process begins when the application upgrade manager receives a request to upgrade a multi-tiered application, such as, for example, multi-tiered application 200 in FIG. 2 (step 602). After receiving the request to upgrade the multi-tiered application in step 602, the application upgrade manager selects an appropriate integrated patch, such as integrated patch 400 in FIG. 4, for upgrading the multi-tiered application (step 604). Then, the application upgrade manager upgrades the software components of the multi-tiered application specified in the selected integrated patch by using an integrated set of patches, such as integrated set of patches 402 in FIG. 4 (step 606).

Subsequent to upgrading the software components in step 606, the application upgrade manager updates the state of the upgraded software components by using state update data, such as state update data 404 in FIG. 4, and saves the updated software component states to a storage unit, such as persistent storage 108 in FIG. 1 (step 608). Then, the application upgrade manager determines patch dependency among the software components, such as, for example, dependency 518, dependency 520, and dependency 522 among patch 1 504 for operating system A, patch 2 506 for middleware B, patch 1 508 for application C, and patch 2 510 for application C in FIG. 5 (step 610).

Afterward, the application upgrade manager constructs an integrated patch based on the determined patch dependency (step 612). Subsequently, the application upgrade manager stores the constructed integrated patch in the storage unit (step 614). The process terminates thereafter.

Thus, illustrative embodiments provide a computer implemented method, system, and computer usable program code for upgrading software components of a multi-tiered application distributed onto a set of virtual machines. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. A computer readable medium can take the form as a computer readable storage medium or propagation medium. For the purposes of this description, a computer-usable or computer-readable storage medium may be any tangible apparatus that may store the program for use by or in connection with the instruction execution system, apparatus, or device.

The medium may be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a propagation medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for upgrading a multi-tiered application, the computer implemented method comprising:
    responsive to receiving, by a computer, a request to upgrade a multi-tiered application in a plurality of multi-tiered applications located within the computer, selecting, by the computer, an appropriate integrated patch for the upgrade to form a selected integrated patch, wherein the computer includes a plurality of virtual machines, and wherein the multi-tiered application includes a plurality of software components that are deployed across the plurality of virtual machines located within the computer, and wherein a software component within the plurality of software components of the multi-tiered application is shared by other multi-tiered applications in the plurality of multi-tiered applications located within the computer;
    upgrading, by the computer, the plurality of software components of the multi-tiered application that are specified in the selected integrated patch, wherein the computer upgrades the plurality of software components by selecting a set of patches within the selected integrated patch that meet specified requirements of the multi-tiered application using a weighted function of minimizing time needed for the upgrading and minimizing service interrupt time;
    updating, by the computer, a state of the plurality of software components of the multi-tiered application that were upgraded to form an updated state of the multi-tiered application;
    identifying, by the computer, a plurality of patches that meet the specified requirements of the multi-tiered application using labels associated with each patch in the plurality of patches, each label including a set of attributes describing which specified requirement of the multi-tiered application a patch in the plurality of patches fulfills;
    determining, by the computer, patch dependency among the software components in the plurality of software components of the multi-tiered application to form a determined patch dependency by using a dependency graph; and
    constructing, by the computer, an integrated patch that includes the plurality of patches based on the determined patch dependency among the software components in the plurality of software components of the multi-tiered application.

2. The computer implemented method of claim 1, wherein the plurality of software components of the multi-tiered application is a deployment manager stack component, an application server stack component, and a database server stack component.

3. The computer implemented method of claim 1, wherein a software component of the multi-tiered application is a stack of software components.

4. The computer implemented method of claim 1, wherein the plurality of software components of the multi-tiered application have a hierarchical structure, and wherein each software component in the plurality of software components include several other software components.

5. The computer implemented method of claim 1, wherein the dependency graph represents direct dependency, and wherein each node in the dependency graph represents a patch for a software component in the plurality of software components of the multi-tiered application, and wherein each arrow in the dependency graph represents a dependency among different patches.

6. The computer implemented method of claim 1, wherein the computer recursively traverses the dependency graph until the computer determines a set of software components that one or more of the plurality of software components depend upon.

7. The computer implemented method of claim 1, wherein a patch for the software component shared by the other multi-tiered applications in the plurality of multi-tiered applications is included in a plurality of dependency graphs associated with the multi-tiered application and the other multi-tiered applications, and wherein the computer recursively traverses the plurality of dependency graphs until the computer determines a set of software components that one or more of the plurality of software components depend upon.

8. The computer implemented method of claim 1, wherein the computer extracts patch dependency data and other information by an automatic process, and wherein the computer uses the patch dependency data and the other information to construct the integrated patch.

9. The computer implemented method of claim 8, wherein the computer extracts the other information by analyzing configuration data generated during software component deployment.

10. The computer implemented method of claim 8, wherein the computer extracts the other information by analyzing software component code.

11. The computer implemented method of claim 1, wherein order constraints specify a particular sequence to the upgrading step and the updating step.

12. The computer implemented method of claim 11, wherein the order constraints include partial order constraints that specify that the plurality of software components are updated in a partial order and optimized during run time of the upgrade of the plurality of software components of the multi-tiered application based on run time data.

13. The computer implemented method of claim 12, wherein run time optimization of the plurality of software components of the multi-tiered application includes minimizing software service interrupt time.

14. A computer system for upgrading a multi-tiered application, the computer system comprising:
- a bus system;
- a storage device connected to the bus system, wherein the storage device stores a set of instructions; and
- a processor connected to the bus system, wherein the processor executes the set of instructions to select an appropriate integrated patch for an upgrade of a multi-tiered application in a plurality of multi-tiered applications located within the computer system to form a selected integrated patch in response to the computer system receiving a request to upgrade the multi-tiered application, wherein the computer system includes a plurality of virtual machines, and wherein the multi-tiered application includes a plurality of software components that are deployed across the plurality of virtual machines located within the computer system, and wherein a software component within the plurality of software components of the multi-tiered application is shared by other multi-tiered applications in the plurality of multi-tiered applications located within the computer system; upgrade the plurality of software components of the multi-tiered application that are specified in the selected integrated patch, wherein the plurality of software components is upgraded by selecting a set of patches within the selected integrated patch that meet specified requirements of the multi-tiered application using a weighted function of minimizing time needed for the upgrade and minimizing service interrupt time; update a state of the plurality of software components of the multi-tiered application to form an updated state of the multi-tiered application; identify a plurality of patches that meet the specified requirements of the multi-tiered application using labels associated with each patch in the plurality of patches, each label including a set of attributes describing which specified requirement of the multi-tiered application a patch in the plurality of patches fulfills; determine patch dependency among the software components in the plurality of software components of the multi-tiered application to form a determined patch dependency by using a dependency graph; and construct an integrated patch that includes a plurality of patches based on the determined patch dependency among the software components in the plurality of software components of the multi-tiered application.

15. A computer program product stored on a computer readable storage medium having computer usable program code embodied thereon that is executable by a computer for upgrading a multi-tiered application, the computer program product comprising:
- computer usable program code for selecting an appropriate integrated patch for an upgrade of a multi-tiered application in a plurality of multi-tiered applications located within the computer to form a selected integrated patch in response to the computer receiving a request to upgrade the multi-tiered application, wherein the computer includes a plurality of virtual machines, and wherein the multi-tiered application includes a plurality of software components that are deployed across the plurality of virtual machines located within the computer, and wherein a software component within the plurality of software components of the multi-tiered application is shared by other multi-tiered applications in the plurality of multi-tiered applications located within the computer;
- computer usable program code for upgrading the plurality of software components of the multi-tiered application that are specified in the selected integrated patch, wherein the plurality of software components is upgraded by selecting a set of patches within the selected integrated patch that meet specified requirements of the multi-tiered application using a weighted function of minimizing time needed for the upgrading and minimizing service interrupt time;
- computer usable program code for updating a state of the plurality of software components of the multi-tiered application to form an updated state of the multi-tiered application;
- computer usable program code for identifying a plurality of patches that meet the specified requirements of the multi-tiered application using labels associated with each patch in the plurality of patches, each label including a set of attributes describing which specified requirement of the multi-tiered application a patch in the plurality of patches fulfills;
- computer usable program code for determining patch dependency among the software components in the plurality of software components of the multi-tiered application to form a determined patch dependency by using a dependency graph; and
- computer usable program code for constructing an integrated patch that includes a plurality of patches based on the determined patch dependency among the software components in the plurality of software components of the multi-tiered application.

16. The computer program product of claim 15, wherein the plurality of software components of the multi-tiered application is a deployment manager stack component, an application server stack component, and a database server stack component.

17. The computer program product of claim 15, wherein a software component of the multi-tiered application is a stack of software components.

18. The computer program product of claim 15, wherein the plurality of software components of the multi-tiered application have a hierarchical structure, and wherein each software component in the plurality of software components include several other software components.

19. The computer program product of claim 15, wherein the dependency graph represents direct dependency, and wherein each node in the dependency graph represents a patch for a software component in the plurality of software components of the multi-tiered application, and wherein each arrow in the dependency graph represents a dependency among different patches.

20. The computer program product of claim 15, wherein the computer recursively traverses the dependency graph until the computer determines a set of software components that one or more of the plurality of software components depend upon.

* * * * *